United States Patent Office.

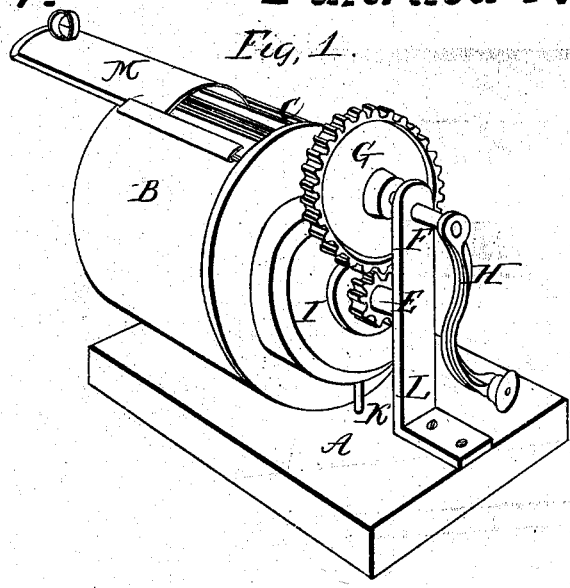
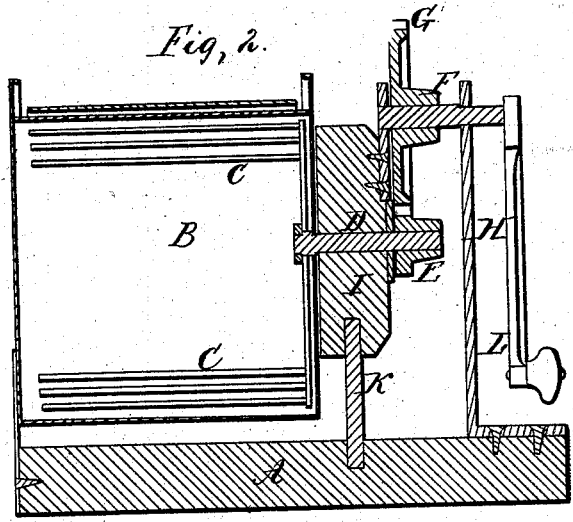
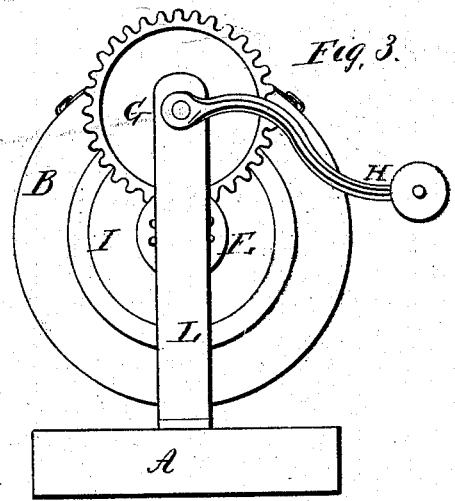

GEORGE E. BRIDGER, OF MILWAUKEE, WISCONSIN.

Letters Patent No. 68,037, dated August 27, 1867.

IMPROVED EGG-BEATER.

The Schedule referred to in these Letters Patent and making part of the same.

TO ALL WHOM IT MAY CONCERN:

Be it known that I, GEORGE E. BRIDGER, of the city and county of Milwaukee, and State of Wisconsin, have invented a new and useful improvement in Egg-Beaters; and I do hereby declare that the following is a full, clear, and exact description thereof, which will enable those skilled in the art to make and use the same, reference being had to the accompanying drawing, forming part of this specification, in which—

Figure 1 is a perspective view.

Figure 2, longitudinal sectional view.

Figure 3, end view.

Similar letters of reference, in each of the figures, indicate corresponding parts.

The object of my invention is to produce a machine that will beat eggs thoroughly and quickly.

A, platform; B, cylinder, within which the eggs are beaten; C, wire beaters; D, shaft of beaters; E, pinion on shaft D; F, crank-shaft; G, cog-wheel on crank-shaft; H, crank, with which to revolve the beaters; I, wood support on the end of cylinder; K, post from platform A to support I; L, crank-shaft support; M, sliding cover of cylinder B.

Operation.

Open slide cover M, as shown fig. 1, break in the eggs, close the cover, and by means of the crank revolve the beaters C, or give them a forward and back motion, as desired, and the eggs will be beaten.

What I claim as my invention, and desire to secure by Letters Patent, is—

Cylinder B with support I and post K, beaters C, shaft D, pinion E, shaft F, cog-wheel G, and crank H, arranged and combined substantially as and for the purpose described.

GEORGE E. BRIDGER.

Witnesses:
G. W. MYGATT,
J. B. SMITH.